United States Patent [19]
Onogi et al.

[11] 4,457,017
[45] Jun. 26, 1984

[54] METHOD OF ADJUSTING POSITION OF SOLID-STATE SCANNING ELEMENT AND MOUNTING SAME

[75] Inventors: Tsuyoshi Onogi; Tetsuya Ueoka, both of Odawara; Nobuo Suzuki, Fujisawa; Yoshihito Oohara; Toshiaki Onozuka, both of Odawara, all of Japan

[73] Assignee: Hitachi, Ltd., Tokyo, Japan

[21] Appl. No.: 272,263

[22] Filed: Jun. 10, 1981

[30] Foreign Application Priority Data

Jun. 11, 1980 [JP] Japan ................. 55-78571

[51] Int. Cl.³ .............................. G06K 9/00
[52] U.S. Cl. ......................... 382/65; 382/45; 250/204; 250/239
[58] Field of Search ............... 250/204, 205, 208, 578, 250/239; 358/212, 213, 241, 285, 293, 294; 382/65–68, 44, 45

[56] References Cited

U.S. PATENT DOCUMENTS

| | | | |
|---|---|---|---|
| 3,538,499 | 11/1970 | Rabinow et al. | 382/67 |
| 3,757,127 | 9/1973 | Dhaka | 250/239 |
| 4,209,692 | 6/1980 | Hudspeth | 250/239 |
| 4,260,880 | 4/1981 | Thomas | 382/68 |
| 4,318,135 | 3/1982 | Allis et al. | 250/239 |

Primary Examiner—Leo H. Boudreau
Attorney, Agent, or Firm—Antonelli, Terry & Wands

[57] ABSTRACT

A method of adjusting the position of a solid-state scanning element and mounting the same, in a manuscript reading optical block included in a manuscript reading part of a solid-state electronic scanning system is disclosed in which the position of the solid-state scanning element is adjusted by handling the solid-state scanning element itself in a state that an adjustment pattern forming an optical standard and a lens support forming a positional standard of a device are set to an adjustment jig, so that the highest optical sensitivity is obtained, and in which a wiring board is fixed to the lens support in such a manner as using the position of a pin of the solid-state scanning element as a guide, while maintaining the solid-state scanning element in the above-mentioned adjusted state, and then the pin of the solid-state scanning element is fixed to the wiring board using a melt made of solder or the like to make an electrical connection therebetween.

7 Claims, 10 Drawing Figures

METHOD OF ADJUSTING POSITION OF SOLID-STATE SCANNING ELEMENT AND MOUNTING SAME

The present invention relates to a method of adjusting the position of a solid-state scanning element and mounting the same, and more particularly to a method of adjusting the position of a solid-state scanning element and mounting the same, in a manuscript reading optical block included in a manuscript reading part of a solid-state electronic scanning system.

Manuscript reading parts incorporated in optical character readers and others are generally classified into a mechanical scanning system and a solid-state electronic scanning system. The solid-state electronic scanning system is mainly employed.

IN THE ACCOMPANYING DRAWINGS

FIG. 1 is a perspective view showing a fundamental arrangement of a manuscript reading part according to a solid-state electronic scanning system employing a solid-state scanning element.

Figure 1:
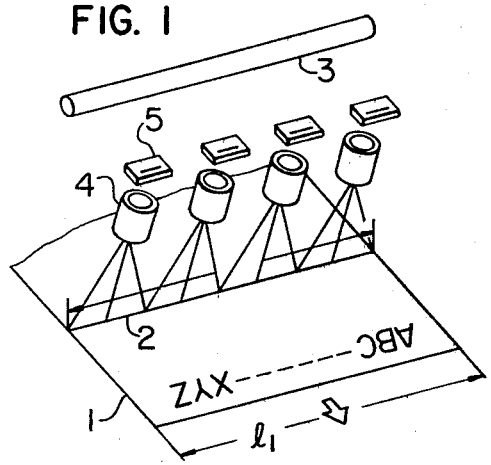
FIG. 1 is a perspective view showing a fundamental arrangement of a manuscript reading part provided with a solid-state scanning element.
Figure 2:
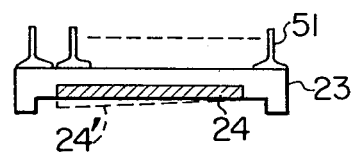
FIG. 2 is a sectional view for showing a structure of the solid-state scanning element shown in FIG. 1.

Referring to FIG. 1, on a manuscript 1 moving in the direction indicated by an arrow there is provided a read-out line 2 for scanning a width $l_1$ of the manuscript 1 at one time. A lamp 3 disposed above the readout line 2 illuminates a region of the manuscript 1 including the read-out line 2. Further, four solid-state scanning elements 5 are arranged above the read-out line 2 in such a manner that an effective read-out width is divided into four parts, and that light rays reflected from each part and having passed through one of the reduction lenses 4 form an image of the part on a corresponding solid-state scanning element 5. That is, one part of the width of the manuscript 1 is allotted to each combination of the reduction lens 4 and the solid-state scanning element 5 to cover the effective read-out width. As shown in FIG. 2, the solid-state scanning element 5 has a structure that a light receiving part 24 including, for example, 1,024 light receiving elements is formed on one surface of a ceramic cover 23 (for example, a silicon case), and the opposite surface thereof is provided with, for example, 1,024 pins for electrical connections.

Figure 3:
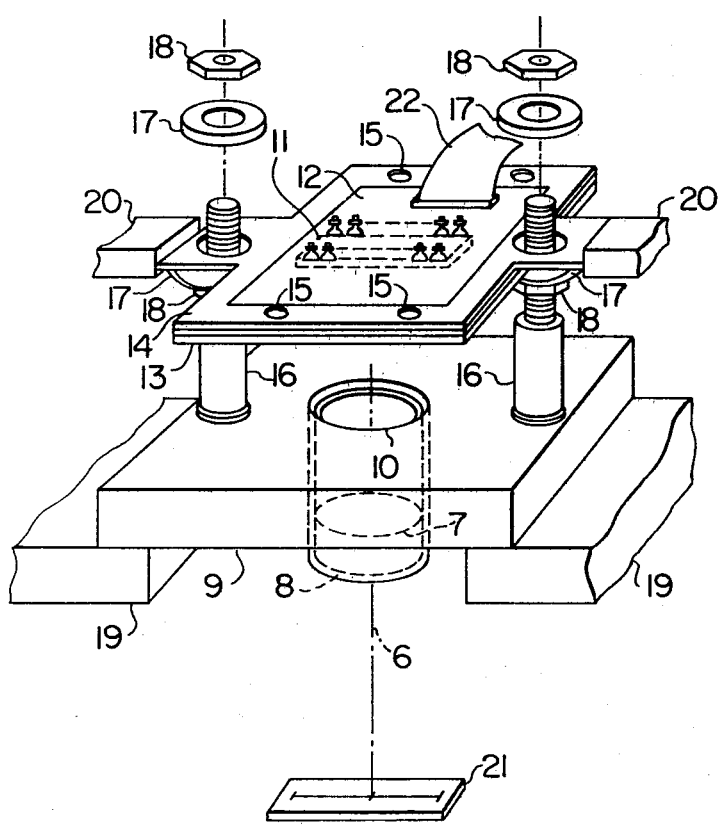
FIG. 3 is a perspective view for showing a structure of a conventional manuscript reading optical block.

FIG. 3 shows a detailed structure of a conventional manuscript reading optical block.

Referring to FIG. 3 a reduction lens 7 on an optical axis 6 of a read-out line is supported by a metal fitting 8 for lens fixation, and the metal fitting 8 is screwed into a through hole 10 provided in a lens support 9. On the backside of the reduction lens 7, a solid-state scanning element 11 is soldered to a wiring board 12 on the optical axis 6. The wiring board 12 is sandwiched between lower and upper plates 13 and 14, and the wiring board 12 and plates 13 and 14 are bound fast at four positions by clamp screws 15. The upper plate 14 is fixed by upper and lower washers 17 and upper and lower nuts 18 to each of two studs 16, which are pushed into the lens support 9.

In such a manuscript reading optical block, it is required to adjust the position and inclination of the solid-state scanning element 11 in relation to the optical axis 6 of the read-out line.

Figure 4:
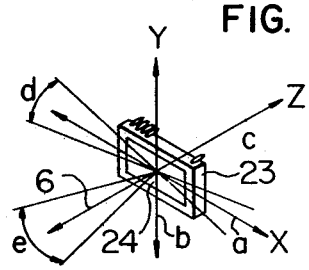
FIG. 4 is a view of the solid-state scanning element shown in FIG. 3 to explain a conventional method of adjusting the position of the solid-state scanning element in the optical block shown in FIG. 3.

FIG. 4 is a view for explaining a method of adjusting the position of the solid-state scanning element shown in FIG. 3.

Referring to FIG. 4 which shows the solid-state scanning element 11 turned sideways, the position of the solid-state scanning element 11 is required to be adjusted with accuracies as high as several tens of microns in each of directions of an X-axis indicated by an arrow a, a Y-axis indicated by an arrow b and a Z-axis indicated by an arrow c, which are defined in relation to the optical axis 6 of the read-out line. Further, when the solid-state scanning element is rotated in such a rotational direction of the X-axis as indicated by an arrow d, read-out lines corresponding to individual solid-state scanning elements are shifted from each other. When the solid-state scanning element is rotated in such a rotational direction of the Z-axis as indicated by an arrow e, bits on the manuscript have image planes different from each other, and therefore read-out accuracy is lowered. Accordingly, the position of the solid-state scanning element is required to be adjusted with accuracies as high as several microns in the rotational directions d and e. Even if the solid-state scanning element is rotated in the rotational direction of the Y-axis in the Y-Z plane, the read-out accuracy is not affected by the above rotation, since only one line is read out. In the case where a plurality of lines are scanned at one time, however, the position of the solid-state scanning element is required to be adjusted with high accuracies in this rotational direction.

Next, explanation will be made on a conventional method of positioning and mounting the solid-state scanning element 11.

Referring to FIG. 3, the lens support 9 is first mounted on a position adjusting jig 19, the solid-state scanning element 11 is soldered to the wiring board 12, and then the wiring board 12 is sandwiched between the lower and upper plates 13 and 14 to be fixed by the clamp screws 15. Then, the upper plate 14 is set in such a manner, that the studs 16 are inserted in the through holes provided at end portions of the upper plate 14 with a clearance of several milimeters, and the end portions of the upper plate 14 are chucked by chucking arms 20 of the jig 19 which can adjust the position of the solid-state scanning element in five directions. In this state, an adjustment pattern 21 placed on the optical axis 6 is read out, output signals from the scanning element 11 are taken out by a lead wire connected to the wiring board 12, and the position of the solid-state scanning element 11 is adjusted so that the highest sensitivity can be obtained. The above adjustment is effected by moving the chucking arms 20 of the adjustment jig 19.

After the adjustment has been completed, the upper plate 14 is fixed to the studs 16 by the upper and lower washers 17 as well as upper and lower nuts 18.

Figure 5:
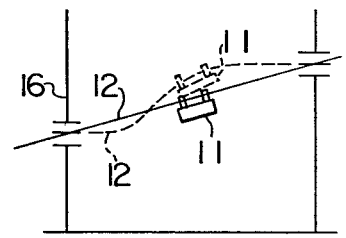
FIG. 5 is an explanatory view for explaining a conventional method of mounting the solid-state scanning element.

In the above-mentioned conventional method, however, owing to such a positional shift of a light receiving part 24' from the ceramic cover 23 of the solid-state scanning element 11 as shown in FIG. 2 and such a positional shift and a rotation of the scanning element 11 in relation to the optical axis 6 as shown in FIG. 4, the wiring board 12 is always inclined at several degrees to a plane perpendicular to the studs 16, as indicated by a solid line in FIG. 5. Accordingly, when the upper plate 14 is fixed to the studs 16 by the washers 17 and nuts 18, the wiring board 12 is deformed as indicated by a broken line in FIG. 5. That is, the solid-state scanning element 11, the position of which has been adjusted with accuracies as high as several microns, is moved as indicated by its broken line position in FIG. 5, and therefore it becomes impossible to read out the adjustment pattern. In other words, according to the conventional method, the adjustment has to be effected many times, a large number of adjustment steps are required to obtain a satisfactory state, and therefore it is difficult to mass-produce the optical block provided with the solid-state scanning element.

Further, since the wiring board 12 is fixed by the washers 17 and nuts 18, the wiring board 12 is not always clamped in a satisfactory fashion. Accordingly, when the optical character reader or the like is carried or operated, the clamp screws are apt to become loose due to vibration, and therefore the solid-state scanning element may be shifted in position.

An object of the present invention is to provide a method of adjusting the position of a solid-state scanning element and mounting the same which can eliminate the above-mentioned drawbacks of the conventional method, in which after the solid-state scanning element has been mounted on a wiring board, it is never required to readjust the position of the solid-state scanning element, that is, the number of steps for adjusting the position of the scanning element is greatly reduced, in which variations in the relative position of the light receiving part in the solid-state scanning element do not raise any question, and in which the clamp screws are prevented from becoming loose due to the vibration of the optical character reader or the like.

According to the present invention, there is provided a method of adjusting the position of a solid-state scanning element and mounting the same, in which the position of the solid-state scanning element is adjusted by handling the solid-state scanning element itself in a state that a special pattern forming an optical standard and a lens support forming a positional standard of a device are set to an adjustment jig, so that the highest optical sensitivity is obtained, and in which a wiring board is fixed to the lens support in such a manner as using the position of a pin of the solid-state scanning element as a guide, while maintaining the solid-state scanning element in the above-mentioned adjusted state, and then the pin of the solid-state scanning element is fixed to the wiring board using a melt made of solder or the like to make an electrical connection therebetween.

Now, the principle and an embodiment of the present invention will be explained with reference to the drawings.

Figure 6:
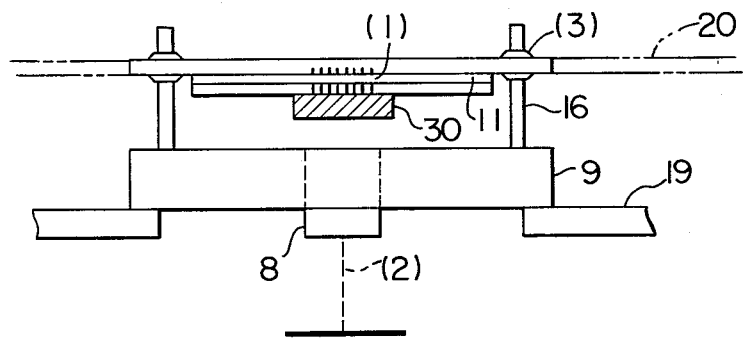
FIGS. 6 and 7 show a conventional method of positioning and mounting a solid-state scanning element and a method of positioning and mounting the solid-state scanning element according to the present invention, respectively, to explain the principle of the present invention.
Figure 7:
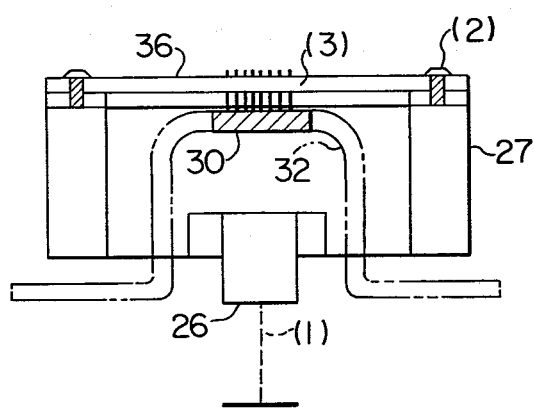

FIGS. 6 and 7 show a conventional method of positioning and mounting a solid-state scanning element and a method of positioning and mounting the solid-state scanning element according to the present invention, respectively, to explain the principle of the present invention.

According to the conventional method, a solid-state scanning element is displaced in relation to an optical axis. In more detail, a wiring board is inevitably inclined at several degrees to a plane perpendicular to studs for the following reasons: (1) it is impossible to form a right angle with accuracies in the order of microns; (2) the light receiving part (or light receiving array) of the solid-state scanning element is inclined to the silicon case thereof; (3) it is impossible to place the axis of a reduction lens exactly at right angles with a standard pattern; and so on. Accordingly, the wiring board is often deformed when clamped to the studs.

In the conventional method of adjusting the position of a solid-state scanning element, as shown in FIG. 6, after a solid-state scanning element 30 has been fixed to a wiring board 11 (step (1)), the position of the solid-state scanning element 30 is adjusted by operating a pair of chucking arms 20 of an adjustment jig 19 so that the element 30 shows the highest sensitivity (step (2)), and then the wiring board 11 is fixed to a lens support 9 through studs 16 (step (3)). Accordingly, the conventional method has a serious drawback that the position of the solid-state scanning element 30 which has been adjusted, is shifted in the last step of fixing the wiring board 11.

In the method according to the present invention, as shown in FIG. 7, only a solid-state scanning element 30 itself is moved by a pair of chucking arms 32 of an adjustment jig (not shown) to adjust the position of the scanning element 30 so that the highest sensitivity is obtained (step (1)), a wiring board 36 is then fixed to a lens support 27 (step (2)), and finally the solid-state scanning element 30 is fixed to the wiring board 36 with solder or the like (step (3)). In other words, according to the present invention, since the position of the solid-state scanning element 30 is adjusted by moving only the scanning element 30 and finally the scanning element 30 thus positioned is fixed to the wiring board 36 with solder or the like, the position of the solid-state scanning element 30 is kept unchanged in the steps after the position adjusting step, that is, the scanning element 30 is never subjected to positional shifting.

Figure 8:
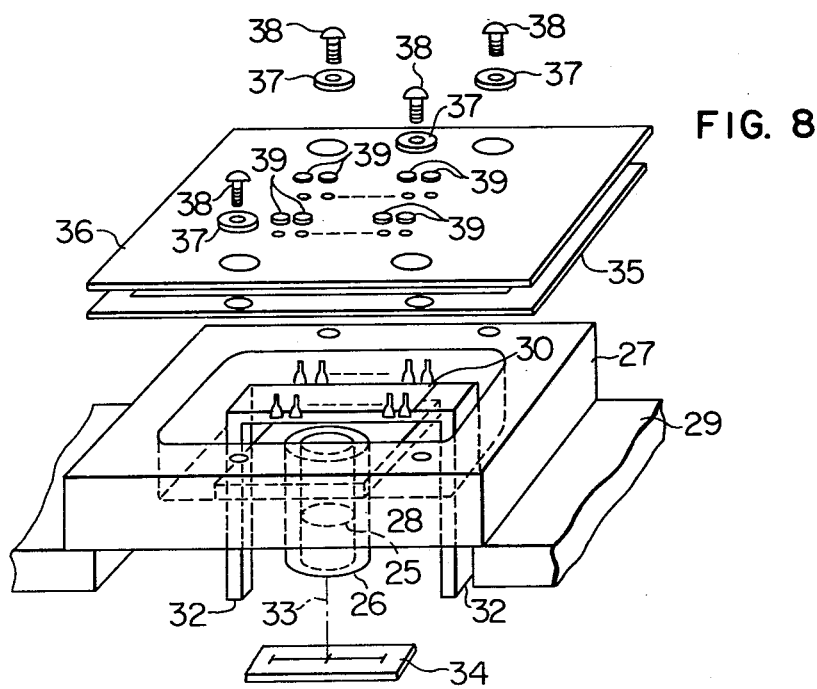
FIG. 8 is an exploded view showing a manuscript reading optical block according to an embodiment of the present invention.

FIG. 8 shows a detailed structure of a manuscript reading optical block according to an embodiment of the present invention.

Referring to FIG. 8, a metal fitting 26 for lens fixation, which includes therein a reduction lens 25, is fitted in a through hole 28 provided in a lens support 27, and then the lens support 27 is mounted on an adjustment jig 29. The lens support 27 shown in FIG. 8 has perforations, to receive a pair of chucking arms 32 of the adjustment jig 29 which can effect positional adjustment in five directions.

Figure 9:
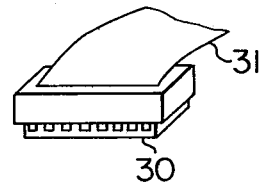
FIG. 9 is a perspective view showing a lead wire with a connector part which is prepared separately from the optical block shown in FIG. 8 and is employed in assembling the optical block.

Since the position of the solid-state scanning element 30 is adjusted by moving only the scanning element 30, a lead wire 22 connected to a wiring board 36 cannot be employed in the position adjusting step. Accordingly, such a lead wire 31 provided with a connector portion as shown in FIG. 9 is additionally prepared and connected to the solid-state scanning element 30, which is held by the chucking arms 32. Then, an adjustment pattern 34 set on an optical axis 33 of read-out line is read out by the scanning element 30, the output signals from the scanning element 30 are taken out by the lead wire 31, and the position of the scanning element 30 is adjusted so that the highest sensitivity is obtained.

After the above adjustment has been completed, the lead wire 31 provided with the connector portion is separated from the solid-state scanning element 30. Then, on the lens support 27 is set a spacer 35 having a thickness corresponding to a distance in the Z-direction between the scanning element 30 and the upper surface of the lens support 27. Further, the wiring board 36 is placed on the spacer 35 in such a manner that pins 51 provided on the scanning element 30 are inserted into corresponding through holes 52 provided in the wiring board 36, and then the wiring board 36 and the spacer 35 are fixed to the lens support 27 at four positions by washers 37 and screws 38.

Figure 10:
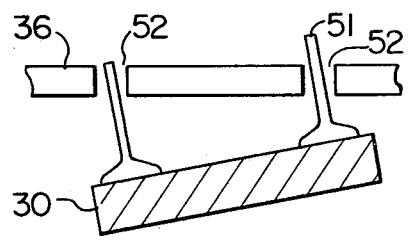
FIG. 10 shows a positional relation between the wiring board and the solid-state scanning element shown in FIG. 8.

FIG. 10 shows a positional relation between the wiring board and the solid-state scanning element which are shown in FIG. 8. Referring to FIG. 10, when the wiring board 36 and the spacer 35 are fixed to the lens support 27, the solid-state scanning element 30 is held by the chucking arms 32 in the state that the pins 51 for electrical connections are inserted in the through holes 52, and an angle of inclination between the scanning element 30 and the wiring board 36 is kept unchanged. For example, in the case where the part of the pin 51 protruding from the shoulder thereof has a length of 3.3 mm and a cross section of 0.4 mm×0.25 mm and the through hole 52 provided in the 1.6 mm thick wiring board 36 has a diameter of 0.9 mm, the solid-state scanning element 30 can be inclined to the wiring board 36 up to about 6 degrees, to obtain the highest sensitivity.

As mentioned above, the clearance between the pin 51 and the through hole 52 allows the inclination of the solid-state scanning element 30 to the wiring board 36. Further, a necessary spacing between the element 30 and the wiring board 36 is given by the spacer 35.

Finally, ring solder 39 is set to each of the pins 51 for electrical connections, and thus the solid-state scanning element 30 is soldered to the wiring board 36. Soldering is made to connect the solid-state scanning element 30 electrically to the wiring board 36 and to fix the scanning element 30 to the wiring board 36. However, the above-mentioned ring solder may be replaced by an adhesive agent containing carbon.

As has been explained in the foregoing, according to the present invention, the wiring board can be readily and horizontally fixed, since the position of the solid-state scanning element is adjusted before the scanning element is soldered to the wiring board, and since the clearance between the through hole provided in the wiring board and the pin provided on the scanning element allows the inclination of the scanning element to the wiring board. Accordingly, it is not required to readjust the position of the solid-state scanning element after the scanning element has been soldered to the wiring board, and therefore the number of position adjusting steps can be greatly reduced. Further, variations in the position of the light receiving part of the solid-state scanning element relative to the silicon case thereof do not raise any question, and therefore inexpensive solid-state scanning elements can be employed. Furthermore, since the wiring board can be firmly fixed to the lens support, the screws do not readily become loose when an optical character reader or the like is carried or operated, and therefore the positional shift of the solid-state scanning element in the field can be avoided.

We claim:

1. A method of adjusting the position of a solid-state scanning element and mounting the same, in a manuscript reading optical block included in a manuscript reading part of a solid-state electronic scanning system, comprising the steps of:

adjusting the position of said solid-state scanning element so to provide an output therefrom of the highest optical sensitivity for an adjustment pattern forming an optical standard, said adjustment pattern and a lens support forming a positional standard being disposed with respect to an adjustment jig for said solid-state scanning element;

fixing a wiring board to said lens support utilizing the position of a pin of said solid-state scanning element as a guide, while maintaining said solid-state scanning element in the adjusted position; and fixing said pin of said solid-state scanning element to said wiring board using a melt to make an electrical connection therebetween, said melt being made of solder or the like.

2. A method according to claim 1, further comprising the steps of providing a through hole in said wiring board with a clearance with respect to said pin to allow the inclination of said solid-state scanning element with respect to said wiring board.

3. A method of adjusting the position of a solid-state scanning element and mounting the same, in a manuscript reading optical block included in a manuscript reading part of a solid-state electronic scanning system, comprising the steps of:

setting an adjustment pattern and a lens support relative to an adjustment jig, said adjustment pattern forming an optical standard, said lens support including therein a lens, said lens support forming a positional standard of a device, a perforation being provided in said lens support;

inserting a chucking arm of said adjustment jig into said perforation of said lens support to hold said solid-state scanning element by said chucking arm;

reading said adjustment pattern by said solid-state scanning element through said lens when said solid-state scanning element is held by said chucking arm, said adjustment pattern being set on a read-out line;

adjusting the position of said solid-state scanning element by said adjustment jig so that an output from said solid-state scanning element is obtained at the highest sensitivity;

setting a wiring board so that a pin provided on said solid-state scanning element is inserted into a through hole provided in said wiring board, while maintaining said solid-state scanning element in an adjusted state;

fixing said wiring board to said lens support; and fixing said pin of said solid-state scanning element to said through hole of said wiring board using a melt to make an electrical connection between said pin and said wiring board, said melt being made of solder or the like.

4. A method according to claim 3, wherein said through hole provided in said wiring board has a clearance to said pin to allow the inclination of said solid-state scanning element with respect to said wiring board.

5. A method according to claim 1 or 3, further comprising the step of interposing a spacer between said lens support and said wiring board to compensate for a positional shift of said solid-state scanning element in the direction of an optical axis.

6. A method according to claim 1, wherein the step of adjusting the position of said solid-state scanning element includes reading the adjustment pattern by said solid-state scanning element along an optical path delimited at least by said lens support.

7. A method according to claim 6, said lens support supports a lens and the reading of the adjustment pattern is effected along the optical path having said lens therein.

* * * * *